Aug. 27, 1929. S. A. MEYERS 1,726,038
OUTLET BUSHING AND WASHER
Filed May 31, 1927
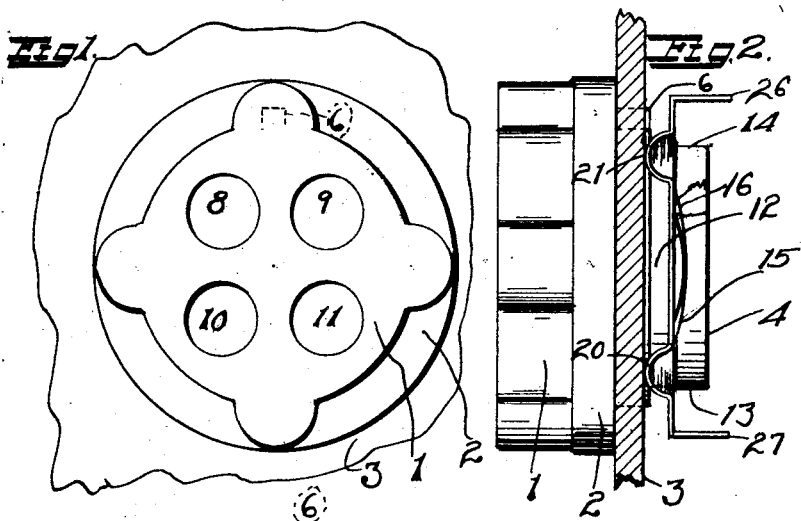
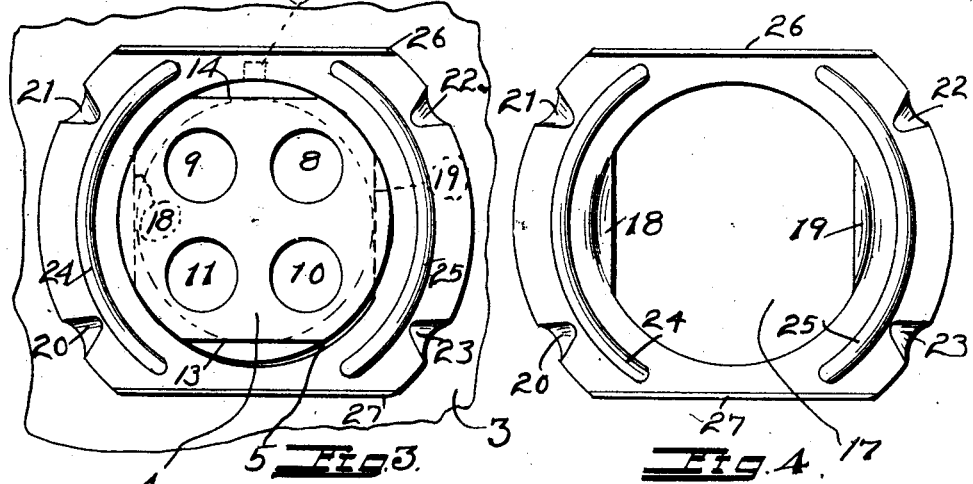
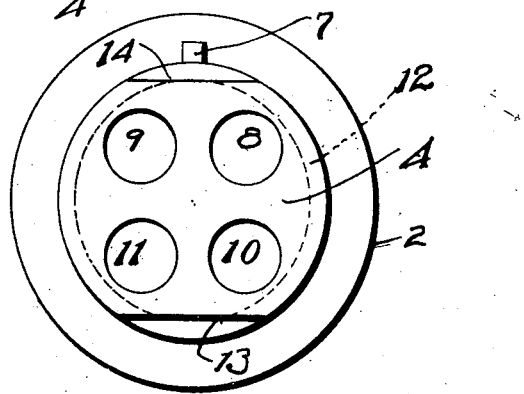
INVENTOR.
Samuel A. Meyers.
BY
Carlos P. Griffin
ATTORNEY.

Patented Aug. 27, 1929.

1,726,038

UNITED STATES PATENT OFFICE.

SAMUEL A. MEYERS, OF SAN FRANCISCO, CALIFORNIA.

OUTLET BUSHING AND WASHER.

Application filed May 31, 1927. Serial No. 195,391.

This invention relates to improvements in outlet bushings and washers of the class where several wires are passed through the same bushing and the bushing held in place by a locking washer and an object of the invention is to provide means to hold the bushing securely so that it will not have a tendency to work loose.

Another object is to provide a lock washer with some resiliency so that it will hold firmly with different thicknesses of wall in which the bushing is held.

An embodiment of the invention is shown in the accompanying drawings in which the same reference numeral is applied to the same portion throughout the several figures of the drawings and of which there may be modifications.

Figure 1 is a front elevation of the bushing shown in a portion of wall in which the bushing is held, Figure 2 is a side elevation of the bushing and lock washer, Figure 3 is a back view showing the lock washer and the back of the bushing, Figure 4 is a plan of the lock washer, and Figure 5 is a rear view of the bushing.

The bushing is of insulating material consisting of the main body 1 having the flange 2 which is adapted to rest against the wall 3 and a cylindrical portion 4 adapted to project through a hole 5 in the wall, the edge of the hole has the notch 6 to allow the projection 7 to enter and prevent the bushing from turning when the washer is turned into place.

The bushing may be of any suitable shape and have any number of holes for wires, in this instance four holes 8, 9, 10 and 11 are shown. The bushing has the annular groove 12 and the flat sides 13 and 14. At right angles to the flat sides the outer face of the groove 12 has the curved recess 15, and diametrically opposite to this recess is a duplicate recess 16 in the groove.

The lock washer has the opening 17 and the bent up lips 18 and 19, the bent down lugs 20 to 23 inclusive in the edge of the washer, the sides 26 and 27 are turned up to form convenient means for turning the washer into place. Raised beads 24 and 25 act to strengthen the washer.

In operation the bushing is placed with the portion 4 projecting through the opening in the wall, the washer is placed over the projecting portion, the lips 18 and 19 passing over the flat sides 13 and 14, and then turned so that the lips engage the groove 12 and spring into the recesses 15 and 16. The lugs 20 to 23 pressing against the wall cause the lips to press against the recessed grooves and hold the bushing securely.

Having thus described my invention, what I desire to secure by Letters Patent of the United States is as follows, but modifications may be made in carrying out the invention as shown in the drawing and in the above particularly described form thereof, within the purview of the annexed claims.

1. An outlet bushing and washer comprising a flanged member, a cylindrical member, projecting therefrom, holes through said members, an annular groove in said cylindrical member spaced from said flange, recesses in the outer wall of said groove, flat sides in said cylindrical member extending to said groove, a metal washer having an opening therethrough to fit over said cylindrical member and be rotatable thereon, raised lips on the edge of said opening, said lips adapted to pass over said flat sides and be turned into engagement with said groove, and the recesses therein when said washer is turned thereon, and lugs bent down on the periphery of said washer.

2. An outlet bushing and washer comprising a main insulating body adapted to bear against a wall, a cylindrical portion on said body adapted to project through an opening in said wall, a plurality of holes through said bushing and an annular groove in the part of said cylindrical portion projecting from the inner side of the wall, diametrically opposite recesses in the outer wall of said groove, flat sides in said cylindrical portion extending from said groove to the end of said cylindrical portion, a metal washer having an opening adapted to fit over said cylindrical portion, diametrically opposite raised lips on the edge of the opening in said washer adapted to engage said groove and said recesses when said washer is placed on said cylindrical portion and turned, and bent down lugs on the outer edge of said washer adapted to bear on the inner side of said wall.

3. An outlet bushing and washer comprising an insulation body having a flange adapted to bear against the outer side of a wall, a cylindrical portion of said body adapted to project through an opening in said wall, an annular groove in said cylindrical portion adjacent the inner side of said wall, diametrically placed recesses in the outer sides of said groove, diametrically placed flat sides on the end of and extending to said groove on said cylindrical portion at right angles to said recesses, a projection on said cylindrical portion adapted to engage a notch in said wall, a metal washer having an opening therethrough adapted to fit over said cylindrical portion, raised lips on the edge of the opening in said washer adapted to engage said groove and said recesses when placed thereon and turned, and bent down lugs on the outer edge of said washer adapted to press against said wall.

In testimony whereof I have hereunto set my hand this 18th day of May, A. D. 1927.

SAMUEL A. MEYERS.